US011366888B2

(12) United States Patent
Jeon et al.

(10) Patent No.: US 11,366,888 B2
(45) Date of Patent: Jun. 21, 2022

(54) ELECTRONIC DEVICE USING A FINGERPRINT SENSOR INCLUDED IN A DISPLAY OF THE ELECTRONIC DEVICE AND CONTROLLING METHOD THEREOF

(71) Applicant: SAMSUNG ELECTRONICS CO., LTD., Suwon-si (KR)

(72) Inventors: Jeonghwan Jeon, Suwon-si (KR); Hyosun You, Suwon-si (KR); Minseok Kang, Suwon-si (KR); Minwoo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 16/564,297

(22) Filed: Sep. 9, 2019

(65) Prior Publication Data

US 2020/0125708 A1    Apr. 23, 2020

(30) Foreign Application Priority Data

Oct. 22, 2018  (KR) .......................... 10-2018-0125936

(51) Int. Cl.
*G06F 21/32*   (2013.01)
*G06F 3/048*   (2013.01)
(Continued)

(52) U.S. Cl.
CPC .............. *G06F 21/32* (2013.01); *G06F 3/048* (2013.01); *G06V 40/1335* (2022.01); *G06V 40/1359* (2022.01); *G06V 40/63* (2022.01)

(58) Field of Classification Search
CPC .......... G06F 21/32; G06F 3/048; G06F 21/84; G06F 21/83; G06F 21/45; G06F 1/1684;
(Continued)

(56) References Cited

U.S. PATENT DOCUMENTS 8,943,580 B2   1/2015   Fadell et al.
9,733,740 B2   8/2017   Cho et al.
(Continued)

FOREIGN PATENT DOCUMENTS

KR   10-2017-0003193   1/2017
WO   2017/073811      5/2017
WO   2020/085643      4/2020

OTHER PUBLICATIONS

International Search Report dated Dec. 24, 2019 in counterpart International Patent Application No. PCT/KR2019/011444.
(Continued)

*Primary Examiner* — Premal R Patel
(74) *Attorney, Agent, or Firm* — Nixon & Vanderhye P.C.

(57) ABSTRACT

Provided is an electronic device. The electronic device may detect a first input on a designated region of a display, obtain fingerprint information corresponding to the first input using the fingerprint sensor, display, on the display, an object related to an application based on obtaining the fingerprint information, detect a second input generated by dragging from the designated region to a region corresponding to the displayed object while the first input is maintained, execute an application related to the object selected by the second input, and perform authentication related to the application based on the fingerprint information.

20 Claims, 7 Drawing Sheets

(51) Int. Cl.
*G06V 40/60* (2022.01)
*G06V 40/12* (2022.01)

(58) Field of Classification Search
CPC ............. G06K 9/00026; G06K 9/0008; G06K 9/00919; G06K 9/00006; G06V 40/1335; G06V 40/1359; G06V 40/63; G06V 40/12
See application file for complete search history.

(56) References Cited

U.S. PATENT DOCUMENTS

| | | | | |
|---|---|---|---|---|
| 2015/0277652 | A1* | 10/2015 | Kim | G06K 9/00892 345/173 |
| 2015/0371073 | A1* | 12/2015 | Cho | G06F 3/0416 382/124 |
| 2016/0011767 | A1 | 1/2016 | Jung et al. | |
| 2016/0042166 | A1* | 2/2016 | Kang | G06F 21/32 726/7 |
| 2016/0092018 | A1 | 3/2016 | Lee et al. | |
| 2017/0076080 | A1 | 3/2017 | Hao et al. | |
| 2017/0244684 | A1* | 8/2017 | Smith | H04L 63/0861 |
| 2017/0300700 | A1 | 10/2017 | Li et al. | |
| 2017/0344733 | A1 | 11/2017 | Woodhull et al. | |
| 2018/0189468 | A1 | 7/2018 | Shim et al. | |
| 2018/0365477 | A1 | 12/2018 | Shim et al. | |
| 2020/0125708 | A1 | 4/2020 | Jeon et al. | |
| 2021/0152685 | A1* | 5/2021 | Li | G06F 3/0484 |

OTHER PUBLICATIONS

Extended Search Report dated Feb. 21, 2020 in counterpart European Patent Application No. 19200123.8.
Notice of Allowance dated Nov. 9, 2020 in corresponding European Patent Application No. 19200123.8.

* cited by examiner

ELECTRONIC DEVICE USING A FINGERPRINT SENSOR INCLUDED IN A DISPLAY OF THE ELECTRONIC DEVICE AND CONTROLLING METHOD THEREOF

CROSS-REFERENCE TO RELATED APPLICATION

This application is based on and claims priority under 35 U.S.C. § 119 to Korean Patent Application No. 10-2018-0125936, filed on Oct. 22, 2018, in the Korean Intellectual Property Office, the disclosure of which is incorporated by reference herein in its entirety.

TECHNICAL FIELD

The disclosure relates to a method of executing an application of an electronic device using a fingerprint sensor included in the display of the electronic device.

BACKGROUND

Electronic devices such as smartphones, tablet computers, and smart watches can be equipped with various sensors. For example, such an electronic device can collect biometric information of the user through a fingerprint sensor, a biometric sensor, or the like. The electronic device may analyze the information collected through the sensor to provide useful information to the user.

A related-art electronic device may include a fingerprint sensor on the front side or the back side. Recently, a method of mounting a fingerprint sensor on a region of the display (in-display technology) has been introduced. The in-display fingerprint sensor can be implemented using an optical technique or an ultrasonic technique.

The user can use the fingerprint sensor to unlock the electronic device. After unlocking the electronic device, the user may have to perform an additional action to execute a desired application. In particular, when authentication is required for application execution, the user may be inconvenienced by having to additionally use the fingerprint sensor.

SUMMARY

Various embodiments of the disclosure provide a method of executing an application on the electronic device using an in-display fingerprint sensor.

According to an example embodiment of the disclosure, an electronic device is provided. The electronic device may include: a display; a fingerprint sensor disposed under a designated region of the display; and a processor. The processor may be configured to control the electronic device to: detect a first input on the designated region; obtain fingerprint information corresponding to the first input using the fingerprint sensor; display, on the display, an object related to an application based on obtaining the fingerprint information; detect a second input caused (e.g., generated) by dragging from the designated region to a region corresponding to the displayed object while the first input is maintained; execute an application related to the object selected by the second input; and perform authentication related to the application based on the fingerprint information.

According to an example embodiment of the disclosure, a method for controlling an electronic device is provided. The method may include: obtaining, upon detecting a first input on a designated region of a display, fingerprint information corresponding to the first input; displaying an object related to an application based on obtaining the fingerprint information; executing, upon detecting a second input generated by dragging from the designated region to a region corresponding to the displayed object while the first input is maintained, an application related to the object selected by the second input; and performing authentication related to the application based on the fingerprint information.

According to an example embodiment of the disclosure, a computer program product is provided. The computer program product may include a non-transitory computer readable storage medium storing instructions that when executed cause a computer to: obtain, upon detecting a first input on a designated region of a display, fingerprint information corresponding to the first input; display an object related to an application based on obtaining the fingerprint information; execute, upon detecting a second input caused by dragging from the designated region to a region corresponding to the displayed object while the first input is maintained, an application related to the object selected by the second input; and perform authentication related to the application based on the fingerprint information.

According to an example embodiment of the disclosure, based on the electronic device being unlocked using the fingerprint sensor, the electronic device may execute a preset application and perform authentication in relation to the application using a touch action for fingerprint recognition and a subsequent successive action.

According to an example embodiment of the disclosure, the electronic device can configure different types of executable applications based on the type of the fingerprint sensed by the fingerprint sensor.

According to an example embodiment of the disclosure, the electronic device can protect the personal information by deleting the recognized fingerprint information after unlocking and executing an application.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
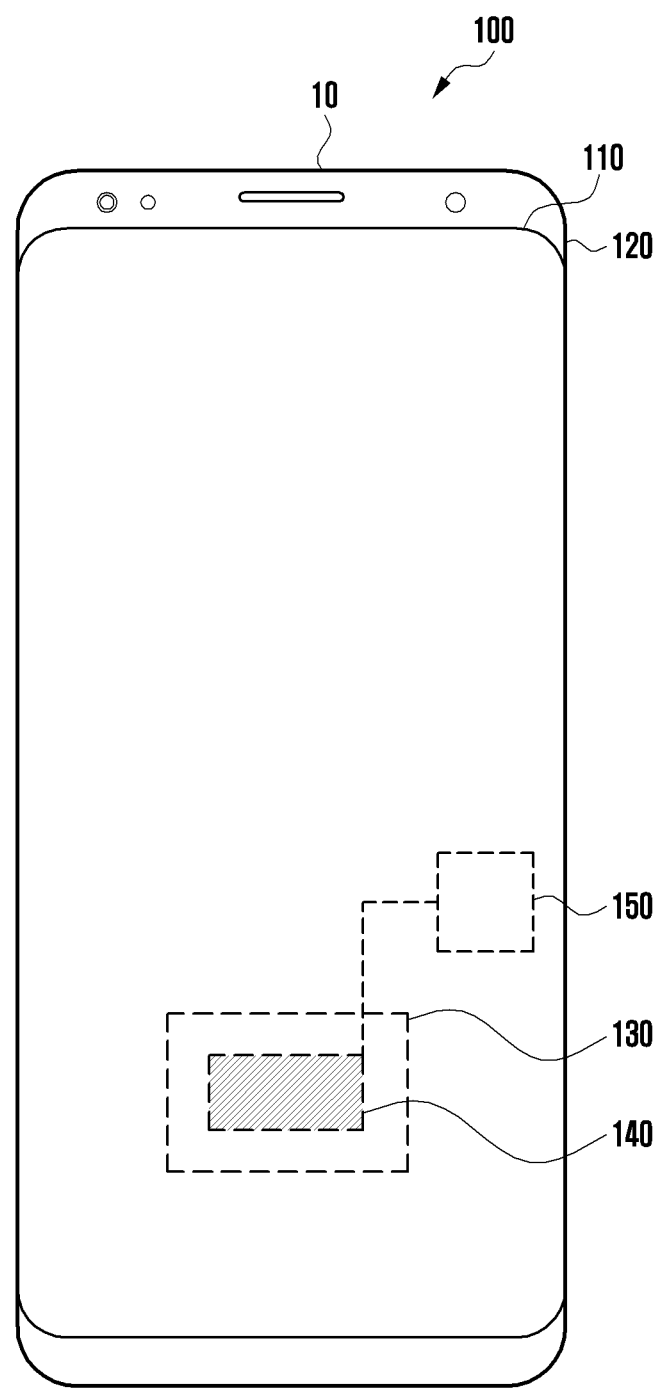
FIG. 1 is a front view of an example electronic device that recognizes an external object using a portion of the display according to various embodiments.

The following description is made with reference to the accompanying drawings. It should be appreciated that the various example embodiments of the present disclosure and the terms used therein are not intended to limit the technological features set forth herein to any particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

The expressions, such as "include" and "may include" which may be used in the present disclosure may refer, for example, to the presence of the disclosed functions, operations, and elements and do not limit one or more additional functions, operations, and elements. In an example embodiment of the present disclosure, the terms, such as "include" and/or "have" may be understood to refer, for example, to a certain characteristic, number, operation, element, component or a combination thereof, but may not be construed to exclude the existence of or a possibility of addition of one or more other characteristics, numbers, operations, constituent elements, components or combinations thereof.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The terms and words used in the following description and claims are not limited to the bibliographical meanings, but, may simply be used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined, for example, by the appended claims and their equivalents. It will be understood that the above-described embodiments are examples to aid in easy understanding of the contents of the present disclosure and do not limit the scope of the present disclosure. Accordingly, the scope of the present disclosure may be defined, for example, by the appended claims, and it will be understood that all corrections and modifications derived from the meanings and scope of the following claims and the equivalent concept fall within the scope of the present disclosure.

An electronic device according to the present disclosure may be a device including a communication function. For example, and without limitation, the device may correspond to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), or the like. It will be apparent to those skilled in the art that the electronic device according to the present disclosure is not limited to the aforementioned devices.

A description is provided below of an electronic device according to various example embodiments with reference to the accompanying drawings. In the description, the term "user" may refer to a person using the electronic device or an apparatus using the electronic device (e.g., artificial intelligence electronic device).

FIG. 1 is a front view 100 of an example electronic device that recognizes an external object using a portion of the display according to various embodiments. In FIG. 1, it is assumed that the external object is a fingerprint of the user, but the disclosure is not limited thereto.

With reference to FIG. 1, the electronic device 10 may include a display (display module) 110 and a main body (housing or frame) 120.

The display 110 may, for example, and without limitation, be a liquid crystal display (LCD), a light emitting diode (LED) display, an organic light emitting diode (OLED) display, a microelectromechanical systems (MEMS) display, an electronic paper, or the like. The display 110 may display various content (e.g., text, images, video, icons, and/or symbols) for the user. The display 110 may include a touchscreen, and may receive a touch input, gesture input, proximity input, hovering input, etc., using, for example, and without limitation, an electronic pen, a portion of the user's body, or the like. The display 110 may include a glass cover (or, window panel) exposed to the outside and various internal layers.

In various embodiments, the display 110 may be arranged to occupy most or the whole (bezel-less) of the front surface of the electronic device 10 (through which the content is primarily output via the display 110). In an example embodiment, the display 110 may be in the form of being extended toward the side (e.g., up/down/left/right) of the electronic device 10.

In various embodiments, the display 110 may include a fingerprint recognition region 130 in at least a portion of the display (in-display). When the user places a finger on the fingerprint recognition region 130, the fingerprint recognition region 130 may be used to collect fingerprint information using, for example, and without limitation, a sound wave reflected from the fingerprint for user authentication.

In various embodiments, when the user grips the electronic device 10 in the vertical mode (or, portrait mode) using one hand (or both hands), the fingerprint recognition region 130 may be a position where at least one thumb of the user is likely to be placed.

In various embodiments, when the fingerprint recognition function is not performed, the fingerprint recognition region 130 can be used to output content such as text or images in the same manner as other parts of the display 110. When the fingerprint recognition function is performed, the fingerprint recognition area 130 may be displayed in a different color from other parts of the display 110, or may be changed to a light emitting state (light is generated in pixels inside the display 110).

In various embodiments, the electronic device 10 may include a fingerprint sensor 140 in (or under) the fingerprint recognition region 130 to recognize an external object using ultrasonic waves.

The fingerprint sensor 140 may, for example, and without limitation, emit an ultrasonic wave toward the fingerprint recognition region 130. The fingerprint sensor 140 may collect sound waves reflected from an external object (e.g., user's finger) and convert the sound waves into a digital image. The fingerprint sensor 140 may capture plural image frames for a given time to obtain an image including the background or user's fingerprint. For example, the fingerprint sensor 140 can capture one image frame within about 40 ms using ultrasonic waves.

In various embodiments, the fingerprint sensor 140 can change the number of image frames to be captured according to a specified condition. For example, when fingerprint recognition is performed for user authentication, the fingerprint sensor 140 may, for example, capture seven image frames to obtain a first sensing image. If fingerprint recognition fails using the first sensing image, the fingerprint sensor 140 may, for example, capture four image frames, less than the number of image frames of the first sensing image, to obtain a second sensing image. After storing the second sensing image in the memory (e.g., trustzone), the fingerprint sensor 140 may, for example, capture seven image frames to obtain a third sensing image. The number of image frames captured by the fingerprint sensor 140 is illustrative and not restrictive.

The fingerprint sensor 140 may transmit the remaining image to the processor (e.g., including processing circuitry) 150 after removing the second sensing image from the third sensing image. The processor 150 may include various processing circuitry and execute a money or security related function (e.g., payment, banking transaction, or unlocking lock screen) based on the image received from the fingerprint sensor 140.

The processor 150 may perform various operations required for the normal functioning of the electronic device 10. The processor 150 may execute software to control at least one other component (e.g., hardware or software component) of the electronic device 10 connected to the processor 150 and may perform various data processing operations and calculations.

In an example embodiment, the processor 150 may control fingerprint recognition of the fingerprint sensor 140 by generating a signal for controlling the fingerprint sensor 140. For example, the processor 150 can control the fingerprint sensor 140 to generate an ultrasonic wave for fingerprint recognition and to collect reflected waves from the external object. The processor 150 may perform various functions (e.g., payment, banking transaction, or unlocking lock screen) based on the image received from the fingerprint sensor 140.

In various embodiments, the electronic device 10 may include, for example, and without limitation, a capacitive fingerprint sensor that senses the ridges and valleys of the fingerprint or an optical fingerprint sensor that captures a fingerprint image with a camera and recognizes the shape of the fingerprint reflected by the visible light as a pattern, and may perform the above-described fingerprint recognition process.

The display 110 may be mounted on the main body 120. The main body 120 may be arranged such that the active area of the display 110 is mainly disposed toward the first side (front surface). The main body 120 may include various components (e.g., processor 150, memory, communication circuitry, battery, substrate, etc.) therein for driving the electronic device 10.

Figure 2:
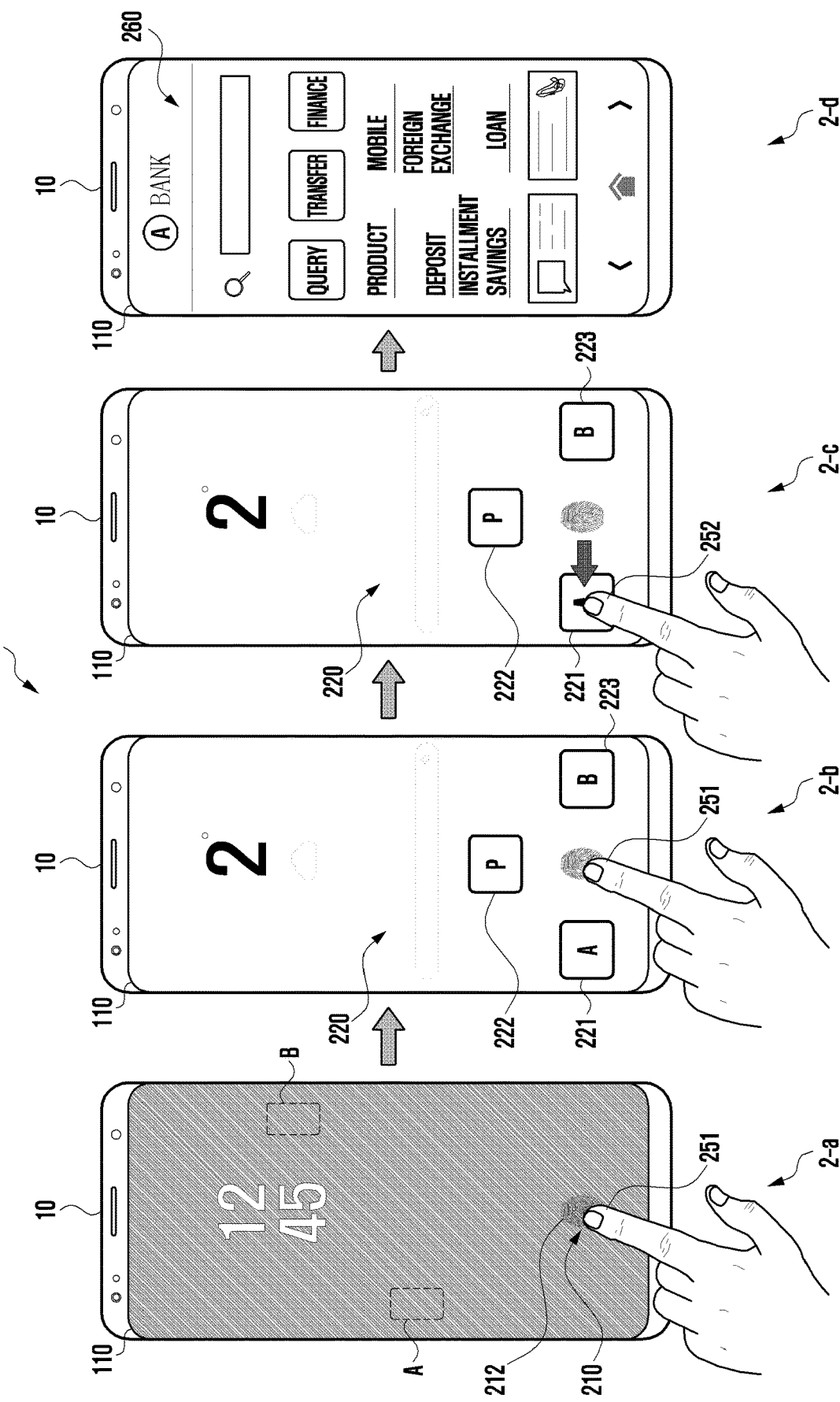
FIG. 2 is a diagram illustrating an example in which an example electronic device executes an application using a fingerprint recognition function according to an embodiment.

FIG. 2 is a diagram illustrating an example 200 where the electronic device executes an application using the fingerprint recognition function according to an embodiment.

In FIG. 2, as indicated by indicia 2-a, the electronic device 10 in the low-power state (or, when the always-on display (AOD) is output on the display 110 in the low power state) may display a fingerprint recognition object 212 (or, fingerprint recognition icon) in a designated region 210 (or, fingerprint recognition region 130) of the display 110.

In the low power state, at least some functions of the electronic device 10 cannot be used (disabled or inactive). The low power state may include the sleep state of the electronic device 10. In the low power state, the display 110 may be turned off and the backlight for the display 110 may also be turned off. The low power state may be referred to as a lock state or a lock screen state.

The fingerprint recognition object 212 can, for example, guide the user to place a finger. The fingerprint recognition object 212 may be in various forms. For example, the electronic device 10 may represent the fingerprint recognition object 212 by displaying a color in the designated region 210 of the display 110. The electronic device 10 can represent the fingerprint recognition object 212 by displaying a preset image (e.g., fingerprint shape) in the designated region 210.

In various embodiments, the electronic device 10 can continuously display the fingerprint recognition object 212 in the low power state. However, this disclosure is not limited thereto. For example, the electronic device 10 may display the fingerprint recognition object 212 when a preset event occurs in the low power state. The preset event may correspond, for example, and without limitation, to movement of the electronic device 10, a touch gesture sensed at a portion of the display 110, or the like.

In various embodiments, the electronic device 10 may change the position at which the fingerprint recognition object 212 is displayed. For example, when a touch input is recognized at a portion of the display 110 in the locked state, the electronic device 10 can display the fingerprint recognition object 212 at the portion where the touch input is recognized.

For example, the electronic device 10 may recognize a touch input at position A or B in the locked state. Then, the electronic device 10 may display the fingerprint recognition object 212 at position A or B, and may initiate the fingerprint recognition process.

As indicated by indicia 2-a, the electronic device 10 may receive a first user input 251 for selecting the designated region 210 where the fingerprint recognition object 212 is displayed. The first user input 251 may be, for example, a touch input touching the designated region with a finger. The electronic device 10 may activate the fingerprint sensor 140 in response to the first user input 251. The electronic device 10 can obtain fingerprint information by sensing the fingerprint of the user through the activated fingerprint sensor.

In an example embodiment, the electronic device 10 may unlock itself and display a home screen, or may store security disabling fingerprint information for disabling security. The electronic device 10 may store a plurality of fingerprints as security disabling fingerprint information.

In an example embodiment, the electronic device 10 may display a user interface element indicating the fingerprint sensing result on the display 110. For example, if the fingerprint information of the user obtained in response to the first user input does not match the security disabling fingerprint information stored in the electronic device 10, the electronic device 10 may repeatedly make a sensing attempt while displaying a user interface element indicating a fingerprint sensing error on the display 110.

In an example embodiment, if the obtained fingerprint information matches the security disabling fingerprint information stored in the electronic device 10, the electronic device 10 may unlock itself and display the user interface.

In various embodiments, the electronic device 10 may identify the time duration when the first user input 251 is maintained, and may display the corresponding user interface if the first user input 251 is maintained for a preset time or longer. For example, the electronic device 10 may display a corresponding user interface when the first user input 251 is maintained for about 0.1 to 0.5 ms or more.

In various embodiments, the electronic device 10 may store the obtained fingerprint information, the result in response to the first user input 251, in the memory (or, trustzone in the memory). The trustzone may refer, for example, to an area of the memory that stores security related information. The security-related information may include, for example, and without limitation, biometric information of the user, PIN information for application execution, PIN information for accessing a security folder, etc.

In FIG. 2, as indicated by indicia 2-b, if the obtained fingerprint information matches the security disabling fingerprint information stored in the electronic device 10, the electronic device 10 may display an application execution user interface on the display 110. For example, the electronic device 10 can unlock itself and invoke the home screen to output the application execution user interface 220 on the display 110.

For example, in the application execution user interface 220, a fog effect may be applied to the display such that the home screen has a preset opacity value.

The application execution user interface 220 may correspond to a situation where the electronic device 10 displays one or more objects 221, 222 and 223 for application execution as an overlay on the display 110 to which the fog effect is applied when the first user input 251 is maintained above a certain level in time or pressure. The electronic device 10 may visually notify the user that the application execution user interface 220 is being executed by applying the fog effect to the display 110 and outputting one or more objects 221, 222 and 223 for application execution on the display 110 representing the fog effect.

In various embodiments, applying the fog effect to the display 110 and displaying objects may correspond to applying the fog effect to a screen on the display 110 and displaying objects on the screen.

The "application" may be, for example, and without limitation, a program that is designed to perform a preset function and stored in the electronic device 10, and may be referred to, for example, as an application program or an app. The "object" may, for example, be a user interface element that can invoke an associated application in response to a user input selecting it.

In various embodiments, the application execution user interface 220 may include one or more objects close to the designated region 210. For example, the at least one object included in the application execution user interface 220 may correspond to an application pre-selected by the user from among security applications requiring additional authentication (e.g., banking application, card application, and payment application).

In various embodiments, while the first user input 251 is maintained, the electronic device 10 may continue to display the application execution user interface 220. When the first user input 251 (e.g., touch input) is not maintained, the electronic device 10 may terminate the display of the application execution user interface 220 and display the home screen.

In an example embodiment, the electronic device 10 can configure objects to be displayed on the application execution user interface 220. For example, the electronic device 10 may provide a default object to be displayed on the application execution user interface 220. The electronic device 10 may provide an object to be included in the application execution user interface 220 as a user interface element specified by the user.

As indicated by indicia 2-b in FIG. 2, the electronic device 10 may display the first object 221, the second object 222, and the third object 223 using the application execution user interface 220.

In an example embodiment, the electronic device 10 may identify a second user input 252 caused by the finger being dragged to a region where an object is located while maintaining the contact, and may execute an application corresponding to the object selected by the second user input 252.

In FIG. 2, as indicated by indicia 2-c, the electronic device 10 may identify a second user input 252 caused by the finger being dragged to a region where the first object is located while maintaining the contact. For example, the second user input 250 may be, for example, a touch-and-drag input in which the touch is initiated in the designated region 210 and moved to a region where at least one object is located. Upon identifying the second user input 252, the electronic device 10 may execute application A corresponding to the first object 221 located in the region where the second user input 252 is generated.

In an example embodiment, to execute application A corresponding to the first object 221, the electronic device 10 may use the fingerprint information obtained and stored in response to the first user input.

For example, for execution of application A, the user may store the user's fingerprint in advance as execution fingerprint information for application A, and may configure settings for application A so that application A is executed after a comparison is made between the newly obtained fingerprint information and the stored execution fingerprint information.

In an example embodiment, to execute application A in response to the second user input 252, the electronic device 10 can perform fingerprint authentication for executing application A using the previously stored execution fingerprint information for application A and the fingerprint information obtained in response to the first user input.

In FIG. 2, as indicated by indicia 2-d, the electronic device 10 may execute application A (260) in response to the second user input 252. For example, application A (260) may be a security application requiring fingerprint authentication for execution initiation or completion (e.g., banking application, card application, payment application, etc.). The electronic device 10 may perform fingerprint authentication of the user before invoking application A (260), and may start or complete the execution of application A (260) without separate fingerprint authentication.

In various embodiments, the user can configure settings for an application so that user authentication is required to perform a function related to the application after initiating the application. For example, the user may configure settings for a banking application so that user authentication is required for remittance. For example, the user can configure settings for the banking application so that the remittance function is performed when the banking application is executed using the application execution user interface 220. In this example, the electronic device 10 can execute the banking application, and perform user authentication for remittance using the stored execution fingerprint information for application A and the fingerprint information obtained in response to the first user input.

In an example embodiment, the electronic device 10 may protect personal information by deleting the fingerprint information obtained and stored in response to the first user input when a preset event occurs.

The preset event may correspond, for example, and without limitation, to at least one of releasing the first user input 251, releasing the second user input 252, performing authentication in association with the application, or the like.

In an example embodiment, upon detecting release of the user touch input after displaying the application execution user interface on the display 110, the electronic device 10 can terminate the display of the application execution user interface 220 and display the home screen. For example, the electronic device 10 may delete the fingerprint information obtained and stored in response to the first user input for unlocking.

In an example embodiment, upon detecting release of the second user input 252, the electronic device 10 can delete the fingerprint information obtained and stored in response to the first user input. For example, when the application is executed in response to the second user input 252, the user can release the touch input on the corresponding object. Upon detecting release of the touch input, the electronic device 10 can delete the fingerprint information obtained and stored in response to the first user input.

In an example embodiment, upon completion of the authentication in association with an application, the electronic device 10 may delete the fingerprint information obtained and stored in response to the first user input. For example, after completing the execution of a banking application or performing fingerprint authentication for remittance, the electronic device 10 may delete the fingerprint information obtained and stored in response to the first user input.

According to an embodiment of the disclosure, the electronic device 10 may unlock itself through the fingerprint sensor 140 embedded in the display 110 and display objects associated with preferred applications of the user at the same time or in sequence. Further, the electronic device 10 may execute the application related to an object selected by a user input. When the user authentication is required for the application, the electronic device 10 can perform user authentication using the fingerprint information obtained and stored in response to the first user input. As such, the electronic device 10 can perform fingerprint authentication many times with a single fingerprint input operation, thereby enabling the user to easily execute the application.

Figure 3:
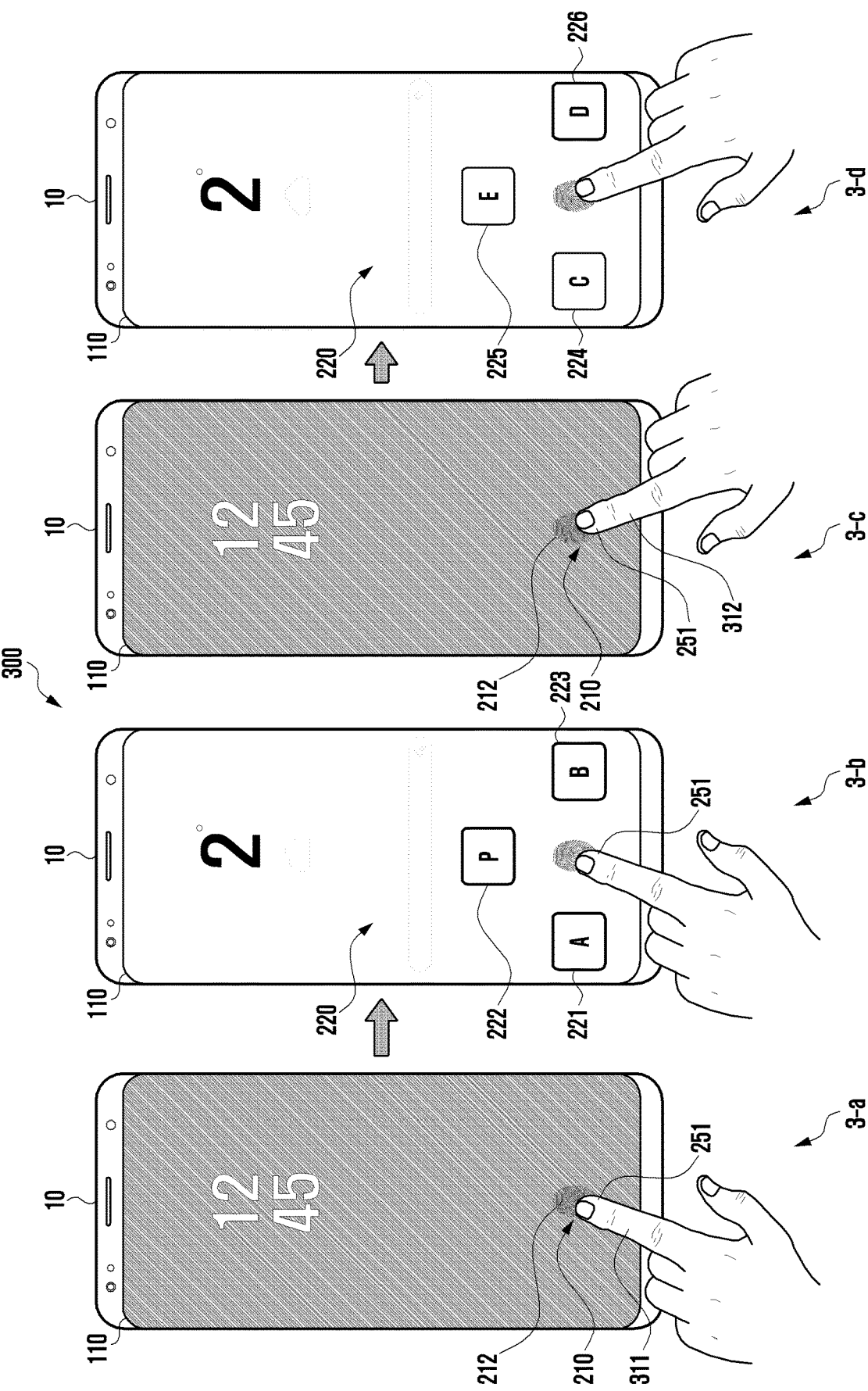
FIG. 3 is a diagram illustrating an example in which an example electronic device displays different types of objects depending on the fingerprint according to an embodiment.

FIG. 3 is a diagram illustrating an example 300 where the electronic device displays different types of objects depending on the fingerprint according to an embodiment.

In an example embodiment, the electronic device 10 may provide a fingerprint registration user interface for registering an object to be displayed in response to a recognized fingerprint while the application execution user interface is displayed.

The user can use the fingerprint registration user interface to register at least one object to be displayed on the application execution user interface in response to the fingerprint of a first finger. For instance, the user may register a first object, a second object, and a third object in relation to the fingerprint of the first finger.

In addition, the user can use the fingerprint registration user interface to register at least one object to be displayed on the application execution user interface in response to the fingerprint of a second finger. For example, the user may register a fourth object, a fifth object, and a sixth object in relation to the fingerprint of the second finger.

In various embodiments, the number of fingers that the user can register is not limited to two, but may be three, four, or more. The number of fingers the user can register may vary depending on the performance of the electronic device 10. In addition, the number of objects that can be registered for one finger is not limited to three, but may be four, five, or more.

In an example embodiment, the electronic device 10 may display an application execution user interface including preset objects according to the type of the fingerprint placed on the designated region 210 where the fingerprint recognition object 212 is displayed in the locked state.

In FIG. 3, as indicated by indicia 3-*a* or 3-*c*, the electronic device 10 in the low-power state (or, when the always-on display (AOD) is output on the display 110 in the low power state) may display a fingerprint recognition object 212 in the designated region 210 (or, fingerprint recognition region 130) of the display 110.

The electronic device 10 can identify a first user input 251 caused by a finger touching the designated region 210 where the fingerprint recognition object 212 is displayed. In response to the touch input, the electronic device 10 can activate the fingerprint sensor 140. The electronic device 10 can sense the fingerprint of the user through the activated fingerprint sensor.

In FIG. 3, as indicated by indicia 3-*a*, the electronic device 10 can detect a touch input by a first finger 311. If the sensing result is recognized as a first fingerprint, as indicated by indicia 3-*b*, the electronic device 10 may display the application execution user interface 220 including a first object 221, a second object 222, and a third object 223 on the display 110 according to the pre-configured settings.

In FIG. 3, as indicated by indicia 3-*c*, the electronic device 10 can detect a touch input by a second finger 312. If the sensing result is recognized as a second fingerprint, as indicated by indicia 3-*d*, the electronic device 10 may display the application execution user interface 220 including a fourth object 224, a fifth object 225, and a sixth object 226 on the display 110 according to the pre-configured settings.

As described above, in an example embodiment, the electronic device 10 can display preset application execution objects corresponding to the type of a recognized fingerprint, enabling the user to easily use various applications.

Figure 4:
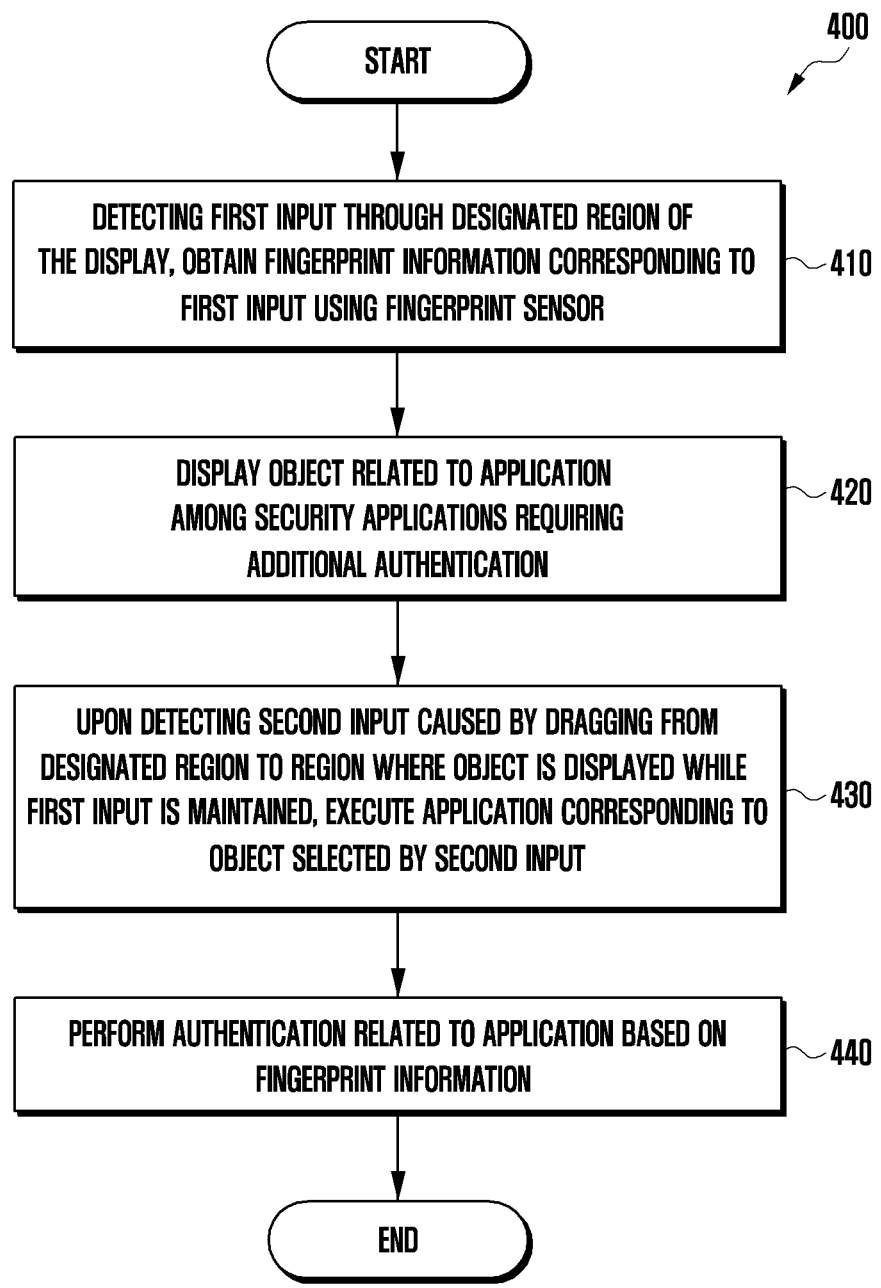
FIG. 4 is a flowchart illustrating an example method for an electronic device to execute an application using fingerprint information according to an embodiment.

FIG. 4 is a flowchart 400 illustrating an example method for the electronic device to execute an application using fingerprint information according to an embodiment.

At operation 410, when a first input 251 is detected through a designated region of the display, the electronic device 10 may obtain fingerprint information corresponding to the first input 251 using the fingerprint sensor.

For example, the first input 251 may be a touch input caused by a finger touching the designated region. The electronic device 10 may activate the fingerprint sensor in response to the touch input, and may obtain fingerprint information by sensing the fingerprint of the user.

At operation 420, the electronic device 10 may display objects related to applications selected from among the security applications requiring additional authentication.

For example, the electronic device 10 can change its state from the locked state to the unlocked state based on the fingerprint information. If the first input 251 is maintained for a preset time or longer, the electronic device 10 may display the application execution user interface including the objects related to applications selected from among the security applications requiring additional authentication.

At operation 430, the electronic device may detect a second input 252 caused by the finger being dragged from the designated region to a region where a specific object is located while maintaining the contact, and may execute the application corresponding to the object selected by the second input 252.

For example, upon detecting a user input caused by the finger being dragged from the designated region to a region where a specific object is located while maintaining the contact, the electronic device 10 may execute the application related to the object.

At operation 440, the electronic device 10 can perform authentication related to the application based on the fingerprint information.

For example, when user authentication is required for the application, the electronic device 10 can perform user authentication using the obtained fingerprint information.

According to an embodiment of the disclosure, a method of controlling the electronic device 10 may include: obtaining, based on a first input being detected through a designated region of the display 110, fingerprint information corresponding to the first input; displaying an object related to an application based on the obtained fingerprint information; executing, upon detecting a second input caused by the finger being dragged from the designated region to a region where the object is located while the first input is maintained, the application related to the selected object; and performing authentication related to the application based on the fingerprint information.

In an example embodiment, the method may include storing the fingerprint information at least as part of obtaining fingerprint information corresponding to the first input.

In an example embodiment, the method may include deleting the fingerprint information upon detecting release of the first input or the second input.

In an example embodiment, the method may include, at least as part of displaying an object related to an application, displaying, based on the fingerprint information corresponding to a first fingerprint, a first object related to a first application associated with the first fingerprint, and displaying, based on the fingerprint information corresponding to a second fingerprint, a second object related to a second application associated with the second fingerprint.

In an example embodiment, the method may include identifying the time duration when the first input is maintained and displaying the object related to the preset application based on the time duration satisfying a preset time condition.

In an example embodiment, the method may include, at least as part of displaying an object related to an application, displaying the object as an overlay on a screen configured to have a specified opacity value.

In an example embodiment, the method may include deleting the fingerprint information based on the authentication related to the application being completed.

In an example embodiment, the method may include terminating the display of the object and displaying the screen with no specified opacity value based on detecting the second input.

In an example embodiment, the method may include performing authentication related to the application during execution of the application.

Figure 5:
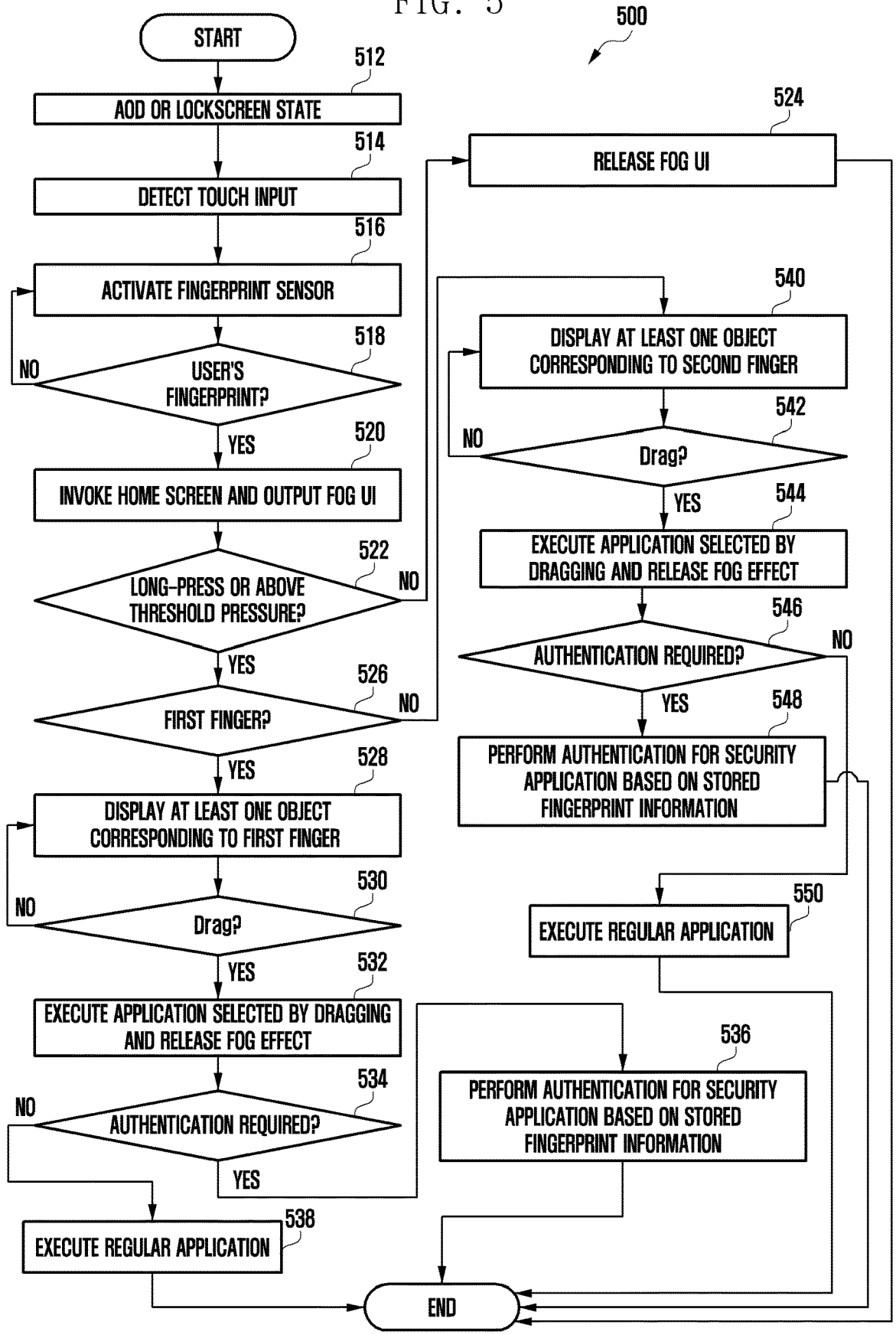
FIG. 5 is a flowchart illustrating an example method for an electronic device to execute an application using fingerprint information according to an embodiment.

FIG. 5 is a flowchart 500 illustrating an example method for the electronic device to execute an application using fingerprint information according to an embodiment.

At operation 512, the electronic device 10 may be in the AOD state or the lock-screen state.

For example, the electronic device 10 may display a fingerprint recognition object in a designated region of the display in the low power state where the AOD feature or the lock screen is activated.

At operation 514, the electronic device 10 may detect a user input touching the fingerprint recognition region.

At operation 516, the electronic device 10 may activate the fingerprint sensor to sense the fingerprint.

For example, the electronic device 10 can activate the fingerprint sensor in response to the user input touching the designated region and can obtain fingerprint information by sensing the fingerprint.

At operation 518, the electronic device 10 may check whether the fingerprint information matches the fingerprint of the user.

For example, the electronic device 10 can check whether the obtained fingerprint information matches the fingerprint information of the user previously stored therein. If the obtained fingerprint of the user does not correspond to the fingerprints previously stored in the electronic device 10, the electronic device 10 may continuously attempt sensing while displaying a user interface element indicating a fingerprint sensing error on the display.

If the obtained fingerprint information matches the fingerprint of the user, at operation 520, the electronic device 10 may invoke the home screen to output the fog user interface.

For example, if the obtained fingerprint information matches the fingerprint of the user, the electronic device 10 may unlock itself and display the home screen on the display 110. For example, the electronic device 10 may apply a fog effect to the display such that the home screen has a preset opacity value.

At operation 522, the electronic device 10 may determine whether the touch input is maintained for a preset time or more or maintains a pressure higher than or equal to a preset value.

If the touch input is not maintained for the preset time or more or does not maintain a pressure higher than or equal to the preset value, at operation 524, the electronic device 10 can release the fog user interface and display the home screen.

If the touch input is maintained for the preset time or more or maintains a pressure higher than or equal to the preset value, at operation 526, the electronic device 10 can check whether the obtained fingerprint information matches the fingerprint information of a first finger among the stored fingerprints of the user.

If the obtained fingerprint information matches the fingerprint information of the first finger, at operation 528, the electronic device 10 may display at least one object corresponding to the first finger on the display.

For example, the electronic device 10 may display an object related to at least one application stored in relation to the first finger.

At operation 530, the electronic device 10 can determine whether a drag input is detected immediately after the touch input.

For example, the electronic device 10 may detect a drag input caused by the finger being dragged to a region where the object is located while the contact is maintained. If a drag input is not detected, the electronic device 10 may continue to display the object. Upon detecting a drag input caused by the finger being dragged to a region where the object is located, at operation 532, the electronic device 10 can execute the application selected by dragging and release the fog effect.

At operation 534, the electronic device 10 may check whether authentication is required in relation to the executed application.

If authentication is required, at operation 536, the electronic device 10 can perform authentication for the security application based on the previously stored fingerprint information.

For example, if user authentication is required to complete the application execution, the electronic device 10 may perform user authentication using the stored fingerprint information.

If authentication is not required, at operation 538, the electronic device 10 can complete the execution of the regular application.

If the obtained fingerprint information matches the fingerprint of a second finger instead of the first finger, at operation 540, the electronic device 10 may display at least one object corresponding to the second finger on the display.

For example, the electronic device 10 may display an object related to at least one application stored in relation to the second finger.

At operation 542, the electronic device 10 can determine whether a drag input is detected immediately after the touch input.

For example, the electronic device 10 may detect a drag input caused by the finger being dragged to a region where the object is located while the contact is maintained. If a drag input is not detected, the electronic device 10 may continue to display the object.

Upon detecting a drag input caused by the finger being dragged to a region where the object is located, at operation 544, the electronic device 10 can execute the application selected by dragging and release the fog effect.

At operation 546, the electronic device 10 may check whether authentication is required in relation to the executed application.

If authentication is required, at operation 548, the electronic device 10 can perform authentication for the security application based on the previously stored fingerprint information.

For example, if user authentication is required to complete the application execution, the electronic device 10 may perform user authentication using the stored fingerprint information.

If authentication is not required, at operation 550, the electronic device 10 can complete the execution of the regular application.

Figure 6:
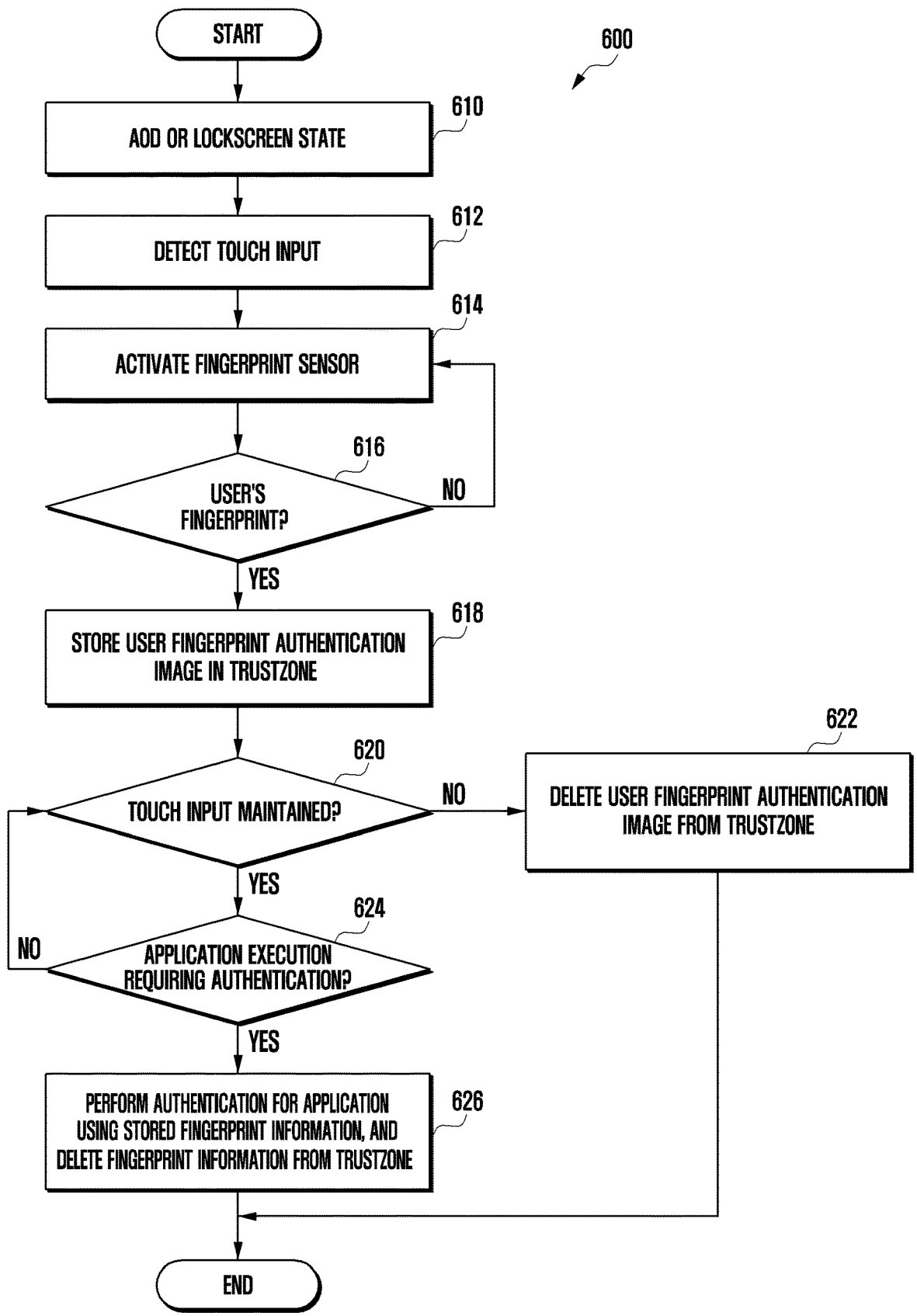
FIG. 6 is a flowchart illustrating an example method for an electronic device to delete obtained fingerprint information according to an embodiment.

FIG. 6 is a flowchart 600 illustrating an example method for the electronic device to delete obtained fingerprint information according to an embodiment.

At operation 610, the electronic device 10 may be in the AOD state or the lock-screen state.

For example, the electronic device 10 may display a fingerprint recognition object in a designated region of the display in the low power state where the AOD feature or the lock screen is activated.

At operation 612, the electronic device 10 may detect a user input touching the fingerprint recognition region.

At operation 614, the electronic device 10 may activate the fingerprint sensor to sense the fingerprint.

For example, the electronic device 10 can activate the fingerprint sensor in response to the user input touching the designated region and can obtain fingerprint information by sensing the fingerprint.

At operation 616, the electronic device 10 may check (determine) whether the fingerprint information matches the fingerprint of the user.

For example, the electronic device 10 can check whether the obtained fingerprint information matches the fingerprint information of the user previously stored therein. If the obtained fingerprint of the user does not match the fingerprints previously stored in the electronic device 10, the electronic device 10 may continuously attempt sensing while displaying a user interface element indicating a fingerprint sensing error on the display.

At operation 618, the electronic device 10 may store the user fingerprint authentication image in the trustzone. For example, if the obtained fingerprint information (fingerprint authentication image) matches the previously stored fingerprint information of the user, the electronic device 10 can store the obtained fingerprint information in the trustzone.

The trustzone may refer, for example, to an area of the memory that stores security-related information. The security-related information may include, for example, and without limitation, biometric information of the user, PIN information for application execution, PIN information for accessing a security folder, or the like.

At operation 620, the electronic device 10 may determine whether the touch input is maintained.

For example, the electronic device 10 may determine whether the touch input is maintained for a preset time or more and/or maintains a pressure higher than or equal to a preset value.

If the touch input is not maintained for the preset time or more or does not maintain a pressure higher than or equal to the preset value, at operation 622, the electronic device 10 may delete the fingerprint information (e.g., user fingerprint authentication image) stored at operation 618 from the trustzone.

If the touch input is maintained for the preset time or more or maintains a pressure higher than or equal to the preset value, at operation 624, the electronic device 10 can check whether an application requiring authentication is being executed. For example, if no authentication is needed, the electronic device 10 can repeatedly check whether the touch input is maintained.

If authentication is required, at operation 626, the electronic device 10 may perform authentication for the application using the stored fingerprint information, and delete the fingerprint information (e.g., user fingerprint authentication image) stored at operation 618 from the trustzone.

Figure 7:
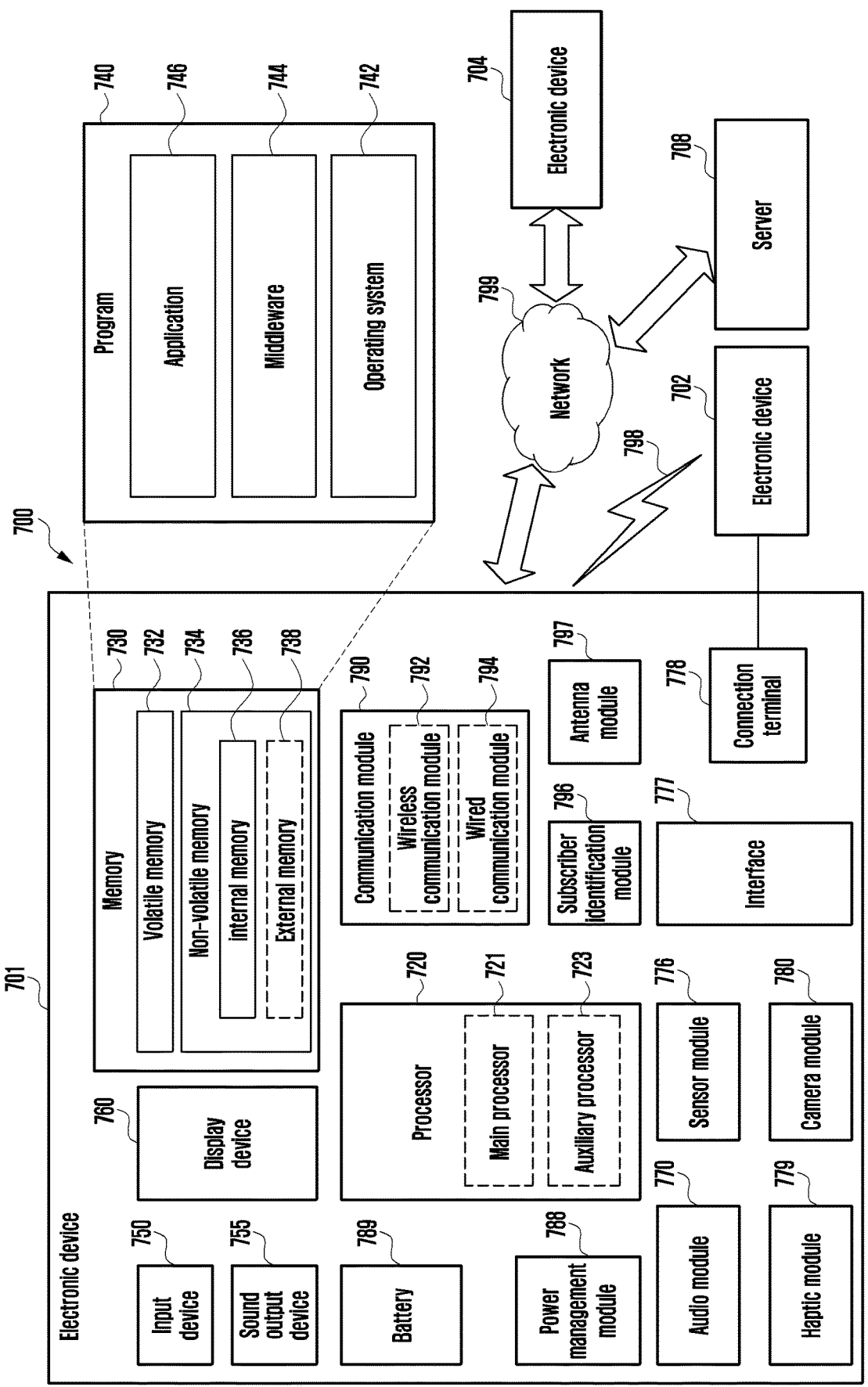
FIG. 7 is a block diagram illustrating an example electronic device in a network environment according to various embodiments.

FIG. 7 is a block diagram illustrating an example electronic device 701 in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network).

According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to an example embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

In an example embodiment, the processor 720 may be configured to control the electronic device to: detect a first input 251 through a designated region of the display 110; obtain fingerprint information corresponding to the first input 251 using the fingerprint sensor; display, on the display 110, an object related to an application determined and/or selected in advance among the security applications requiring additional authentication besides the fingerprint information; detect a second input 252 caused by dragging from the designated region to a region where the object is located while the first input 251 is maintained; execute the application related to the object selected by the second input 252; and perform authentication related to the application based on the fingerprint information.

In an example embodiment, the electronic device 10 may further include a memory 730. The processor 720 may be configured to store the fingerprint information in the memory 730 at least as part of obtaining fingerprint information corresponding to the first input 251.

In an example embodiment, the processor 720 of the electronic device 10 may be configured to delete the fingerprint information from the memory 730 based on detecting release of the first input 251 or the second input 252.

In an example embodiment, the processor 720 of the electronic device 10 may be configured, at least as part of displaying an object related to an application, control the display to: display, based on the fingerprint information corresponding to a first fingerprint, a first object related to a first application associated with the first fingerprint; and display, based on the fingerprint information corresponding to a second fingerprint, a second object related to a second application associated with the second fingerprint.

In an example embodiment, the processor 720 of the electronic device 10 may be configured to identify the time duration that the first input 251 is maintained and to control the display to display the object related to the preset application based on the time duration satisfying a preset time condition.

In an example embodiment, the processor 720 of the electronic device 10 may be configured to control the display to display the object as an overlay on a screen configured to have a specified opacity value, at least as part of displaying an object related to a preset application.

In an example embodiment, the processor 720 of the electronic device 10 may be configured to control the electronic device to delete the fingerprint information from the memory 730 based on the authentication related to the application being completed.

In an example embodiment, the processor 720 of the electronic device 10 may be configured to control the electronic device to terminate the display of the object and display the screen with no specified opacity value based on detecting the second input 252.

In an example embodiment, the processor 720 of the electronic device 10 may be configured to perform authentication related to the application during execution of the application.

In an example embodiment, the processor 720 of the electronic device 10 may be configured to perform authentication associated with the application to execute a preset function of the application during execution of the application.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

In an example embodiment, the memory 730 may include a trustzone. The trustzone may refer, for example, to an area of the memory that stores security-related information. The security-related information may include, for example, and without limitation, biometric information of the user, PIN information for application execution, PIN information for accessing a security folder, etc.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to an example embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™ wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will the understood that the various example embodiments are intended to be illustrative, not limiting. One of ordinary skill in the art will understand that various changes in form and detail may be made without departing from the true spirit and full scope of the disclosure as may be defined, for example, by the appended claims and their equivalents.

What is claimed is:
1. An electronic device comprising:
a display;
a fingerprint sensor disposed under a designated region of the display; and
a processor,
wherein the processor is configured to control the electronic device to:
detect a first input on the designated region;
obtain fingerprint information corresponding to the first input using the fingerprint sensor;
while the first input is maintained, display, on the display, an object related to an application based on obtaining the fingerprint information;
detect a second input generated by dragging from the designated region to a region corresponding to the displayed object while the first input is maintained;
execute an application related to the object selected by the second input;
perform authentication related to the application based on the fingerprint information; and
based on the first input being removed before detecting the second input, terminate the display of the object related to the application.
2. The electronic device of claim 1, further comprising a memory, wherein the processor is configured to control the electronic device to store the fingerprint information in the memory, at least as part of obtaining fingerprint information corresponding to the first input.

3. The electronic device of claim 2, wherein the processor is configured to control the electronic device to delete the fingerprint information from the memory based on the authentication related to the application being completed.

4. The electronic device of claim 1, wherein the processor is configured, at least as part of displaying an object related to an application, to control the display to:
displap, based on determining that the fingerprint information corresponds to a first fingerprint, a first object related to a first application set in association with the first fingerprint; and
display, based on determining that the fingerprint information corresponds to a second fingerprint, a second object related to a second application set in association with the second fingerprint.

5. The electronic device of claim 1, wherein the processor is configured to:
identify a time duration based on the first input being maintained through the designated region; and
display the object related to the application based on the time duration satisfying a preset time condition.

6. The electronic device of claim 1, wherein the processor is configured to control the display to display the object as an overlay on a screen configured to have a specified opacity value, at least as part of displaying an object related to an application.

7. The electronic device of claim 6, wherein the processor is configured to control the display to terminate, based on detecting the second input, the display of the object and display the screen with no specified opacity value.

8. The electronic device of claim 1, wherein the processor is configured to perform authentication related to the application during execution of the application.

9. The electronic device of claim 1, wherein the processor is configured to perform authentication associated with the application to execute a preset function of the application during execution of the application.

10. An electronic device comprising:
a display;
a fingerprint sensor disposed under a designated region of the display;
a memory and
a processor,
wherein the processor is configured to control the electronic device to:
detect a first input on the designated region;
obtain fingerprint information corresponding to the first input using the fingerprint sensor;
display, on the display, an object related to an application based on obtaining the fingerprint information;
detect a second input generated by dragging from the designated region to a region corresponding to the displayed object while the first input is maintained;
execute an application related to the object selected by the second input;
perform authentication related to the application based on the fingerprint information;
control the electronic device to store the fingerprint information in the memory, at least as part of obtaining fingerprint information corresponding to the first input; and
control the electronic device to delete the fingerprint information from the memory based on detecting release of at least one of the first input or the second input.

11. A method of controlling by an electronic device, the method comprising:
obtaining, based on detecting a first input on a designated region of a display, fingerprint information corresponding to the first input;
while the first input is maintained, displaying an object related to an application based on obtaining the fingerprint information;
executing, based on detecting a second input generated by dragging from the designated region to a region corresponding to the displayed object while the first input is maintained, an application related to the object selected by the second input;
performing authentication related to the application based on the fingerprint information; and
based on the first input being removed before detecting the second input, terminating the display of the object related to the application.

12. The method of claim 11, comprising storing the fingerprint information, at least as part of obtaining fingerprint information corresponding to the first input.

13. The method of claim 12, comprising deleting the stored fingerprint information based on the authentication related to the application being completed.

14. The method of claim 11, comprising, at least as part of displaying an object related to an application:
displaying, based on determining that the fingerprint information corresponds to a first fingerprint, a first object related to a first application set in association with the first fingerprint; and
displaying, based on determining that the fingerprint information corresponds to a second fingerprint, a second object related to a second application set in association with the second fingerprint.

15. The method of claim 11, comprising:
identifying a time duration based on the first input being maintained on the designated region; and
displaying the object related to the application based on the time duration satisfying a preset time condition.

16. The method of claim 11, comprising displaying the object as an overlay on a screen configured to have a specified opacity value, at least as part of displaying an object related to an application.

17. The method of claim 16, comprising terminating, based on detecting the second input, the display of the object and displaying the screen with no specified opacity value.

18. The method of claim 11, comprising performing authentication related to the application during execution of the application.

19. A method of controlling by an electronic device, the method comprising:
obtaining, based on detecting a first input on a designated region of a display, fingerprint information corresponding to the first input;
displaying an object related to an application based on obtaining the fingerprint information;
executing, based on detecting a second input generated by dragging from the designated region to a region corresponding to the displayed object while the first input is maintained, an application related to the object selected by the second input;
performing authentication related to the application based on the fingerprint information;
storing the fingerprint information, at least as part of obtaining fingerprint information corresponding to the first input; and
deleting the stored fingerprint information based on detecting release of at least one of the first input or the second input.

20. A computer program product including a non-transitory computer-readable storage medium storing instructions wherein the instructions when executed cause a computer to:
- obtain, based on detecting a first input on a designated region of a display, fingerprint information corresponding to the first input;
- while the first input is maintained, display an object related to an application based on obtaining the fingerprint information;
- execute, based on detecting a second input generated by dragging from the designated region to a region corresponding to the displayed object while the first input is maintained, an application related to the object selected by the second input; and
- perform authentication related to the application based on the fingerprint information; and
- based on the first input being removed before detecting the second input, terminating the display of the object related to the application.

* * * * *